Feb. 2, 1943.   R. J. CLAY   2,309,934
ELECTRICAL MEASURING DEVICE
Filed July 22, 1941
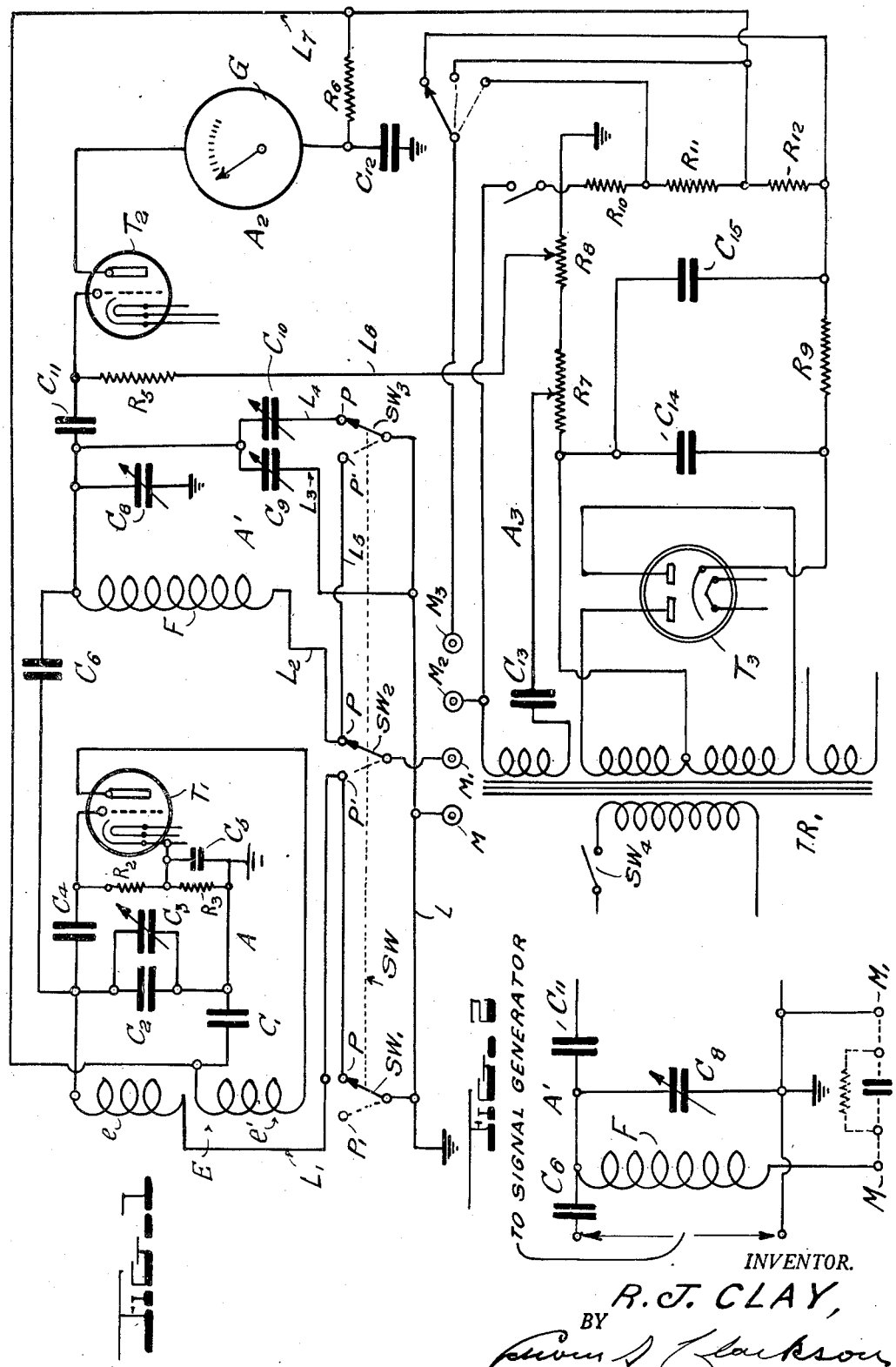
INVENTOR.
R. J. CLAY,
BY
ATTORNEY Patented Feb. 2, 1943

2,309,934

UNITED STATES PATENT OFFICE 2,309,934

ELECTRICAL MEASURING DEVICE

Roby J. Clay, Sturgis, Mich.

Application July 22, 1941, Serial No. 403,579

10 Claims. (Cl. 175—183)

This invention relates to an electrical measuring device and particularly to a device for measuring the capacity and quality of a condenser as connected for use in a radio circuit without disconnecting either end of the condenser from its effective circuit.

It is desirable in testing and measuring the capacity and value of a condenser in a radio circuit to be able to do so without disconnecting either end of the condenser from its effective circuit. One reason for this is, besides the incidental extra time and labor involved in disconnecting a condenser lead, that the condenser or other associated parts of the circuit are liable to be injured in making the disconnection. Another and important reason is that test of a disconnected condenser is not reliable as showing its capacity and value as used in the circuit, as the effective capacity of the condenser in use may vary from that of the disconnected condenser per se, i. e., its rated capacity, since such effective capacity is dependent upon other factors contributing to and influencing the effective capacity of the condenser.

One object of my invention is to provide a simple, reliable and efficient type of measuring device whereby the effective capacity and quality of a condenser as used in any particular radio circuit may be measured without disconnecting the condenser or associated parts in any manner from the radio circuit.

Another object of the invention is to provide a measuring device for accurately measuring the capacity of a condenser connected in parallel with a low ohm resistance, or in a low or high resistance circuit, or to a D. C. voltage supply, or under other actual operating conditions occurring in its use in a radio circuit.

Other objects and advantages of my invention will appear in the course of the subjoined description with reference to the accompanying drawing, in which:

Fig. 1 is a schematic diagram of an exemplificative form of measuring device embodying my invention.

Fig. 2 is a diagram illustrative of the basic principle of the invention.

Referring now more particularly to the drawing, Fig. 1 shows an exemplificative type of apparatus for use which embodies in general a signal generating circuit A, a tuned resonance circuit A', a measuring or indicating circuit A2, and a voltage supply circuit A3.

The circuit A includes an oscillator tube T—1 in a network comprising a coil E having primary and secondary grid and plate windings e, e', condensers C1, C2, C3, C4 and C5 and resistors R2, R3. The arrangement of these parts is such as to form an oscillating circuit when there is mutual inductance between the coils.

The circuit A' includes a tuned resonance coil F coupled to the circuit A by condenser C6, a variable tuning condenser C8 and padding condensers C9, C10.

The circuit A2 is or may be that of an A. C. tube voltmeter circuit comprising tube T2, condenser C11, resistor R5 and meter G. Condenser C11 couples this circuit to that of the tuned inductance coil F at the high potential end. When inductance coil F is tuned by variable condenser C8 to resonance with that of the signal generated by oscillator tube T—1 resonance will be indicated on meter G by the maximum deflection of the meter from its zero point.

The circuits A and A' further include a grounded lead L, a lead L1 from the low potential end of winding e, a lead L2 from the low potential end of coil F, a lead L3 normally connecting condenser C9 to the lead L, a lead L4 from condenser C10, a lead L5 connected to lead L2, and leads L6, L7 connecting elements of the circuits A, A', A2 and A3. In each of leads L1 and L5 are two switch contacts P, P1, in lead L4 is a contact P in associated relation to contact P1 in lead L5, and adjacent contact P in lead L1 is another contact P1 normally disconnected from all circuit connections. M, M1 are test terminals to be engaged with the ends of the condenser to be tested. Terminal M is connected as shown to lead L.

Switch SW is a three pole double throw switch comprising switch members SW1, SW2, SW3, two of which are connected permanently to lead L and the third to test terminal M1. These switch members are coupled for movements in unison and arranged for cooperation with the sets of contacts P, P1, as shown.

The filament and voltage circuit network comprises switches SW2, SW3 and SW4, transformer TR1, rectifier tube T3, condensers C12, C13, C14 and C15, variable resistors R7 and R8, fixed resistors R9, R10, R11 and R12, voltage leads L6, L7, and output terminals M2, M3. This circuit may be of the generally known type shown or any other suitable for supplying the proper voltages.

The switches SW1, SW2, SW3 when engaged with the contacts P adapt the device for measuring the capacities of condensers within a certain capacity range, while the switches when engaged with contacts P1 adapt the device for measuring the capacities of condensers within different capacity range. Condenser C8 is calibrated to cover these ranges.

Laboratory standard condensers of fixed capacities are used in calibration of the dial of the variable condenser C8 for range P1. The lowest value capacity .01 mfd. is connected to test terminals M and M1, the variable condenser C8 is set to a near minimum capacity, the padder C9 is then adjusted so that resonance is indicated on the meter G by maximum deflection, and this point of resonance on dial of the variable condenser C8 is marked as .01 mfd. Condensers of different values of capacity up to and including .5 mfd. are now plotted by varying the capacity of condenser C8 to resonance indication on the meter G.

Laboratory standard capacitators are used in plotting the dial of variable condenser C8 for range P. The lowest value capacity .00001 mfd. is electrically connected to test terminals M and M1, the variable condenser C8 is then set to a near maximum capacity and the padder C10 is adjusted so that resonance is indicated on meter G. This point on dial of condenser C8 is marked as .00001 mfd. Condensers of higher values of capacity up to and including .01 mfd. can now be plotted on the dial of variable condenser C8 by varying capacity of condenser C8 to resonance indication on meter G for each condenser.

The capacity range of the measuring device is limited only by the frequency generated by the oscillator circuit and the size of inductance coil F. The ranges indicated, for example, are those most commonly used in radio and amplifier circuits.

When the switch members SW1, SW2 and SW3 are in engagement with contacts P1 the switch member SW—1 opens the circuit of low potential end of the secondary coil E from ground potential, switch member SW2 connects test terminal M1 with low potential end of secondary coil E, and switch member SW3 opens the circuit of padding condenser C10 from ground potential. Due to the open circuit arrangement of secondary coil E, the tube T1 will not oscillate in the absence of a condenser to be tested across the test terminals M and M1. If, however, a condenser with the capacity range of .01 mfd. to .5 mfd. is connected with one of its leads to test terminal M and the other lead to test terminal M1, tube T1 will oscillate at a frequency dependent upon the capacity value of the condenser so connected. The larger the capacity of the condenser the lower the frequency, the lower the capacity of the condenser the higher the frequency. In this manner a change of frequency is obtained for every change of capacity in the capacity range P1.

The condenser when so connected to terminals M and M1 effects a by-pass for low potential end of coil E to ground potential, allowing tube T1 to oscillate at a frequency dependent upon the capacity value of condenser so connected, for it reduces the effective capacity of condensers C2 and C3 over secondary coil E by its series contacts with low potential end of secondary coil E and ground potential, which is common to condensers C2 and C3, respectively.

The signal generated in circuit of tube T1 is carried to coil F by coupling condenser C6 which is connected to high potential ends of secondary coil E and coil F.

With switch member SW1 in engagement with its contact P1 and switch member SW3 in engagement with its contact P1, switch member SW3 places the low potential end of coil F to ground potential and the variable condenser C8 and padder C9 are thus effective over inductance coil F by direct contact.

When switch members SW1, SW2, SW3 are shifted into engagement with contacts P a different action is obtained. That is, switch member SW1 connects the low potential terminal of secondary coil E to ground potential, and oscillator tube T1 generates a R. F. signal of fixed frequency, switch member SW3 opens the low potential terminal of coil F from ground potential, and switch member SW2 connects test terminal M1 to low potential terminal of coil F. Now any condenser within the capacity range P connected to test terminals M and M1 by-passes low potential terminal of coil F to ground potential and also reduces the effective capacity of condensers C8, C9 and C10, respectively, thus changing the tuning range of the circuit A' for resonance actions to measure the capacity of condensers within this capacity range.

Condensers of unknown capacities can be measured for capacity rating by connecting them to test terminals M and M1 by varying the capacity of condenser C8 on range positions P and P1 of the switches SW1, SW2, SW3 until a maximum deflection of meter G indicates resonance. Point of resonance on calibrated dial will then plainly show the capacity of the condenser being tested. Due to the fact that the capacity of the unknown condenser effects only the low potentials of electrical circuits involved in the testing device, low resistance circuits such as, low resistance connected in parallel with condensers of unknown values, have a very neglibible effect upon the measurement of such condensers.

Due to the use of the D. C. blocking condensers C4, C6 and C11 at high potential ends of secondary coils E and F, respectively, and the fact that the low potential ends of said coils are not directly connected to a ground potential, there is no effective circuit for D. C. voltage from terminals M and M1 to any portion of tester circuit. A condenser connected to test terminals M and M1 may therefore be measured for both quantity and quality while such condenser is electrically connected to a D. C. voltage supply.

Direct shorts of condensers under test will be indicated on calibrated dial at the maximum capacity setting of condenser C8 for range P1, and for minimum capacity setting on range P.

Fig. 2 shows the basic idea of my device whereby condensers may be measured in low or high resistance circuits and under actual operating conditions without having to release either lead of the condenser from its effective circuit. As indicated a resistance has a very negligible effect when connected to test terminals M and M1 for the reason that in the resulting impedance of, say, a resistor of 10 ohms, condenser C8 and inductive coil F the only principle frequency reactance is by inductive coil F. The capacity reactance of condenser C8 is of negligible value as to being a part of the tuned circuit until a condenser value is connected to terminals M and M1. As the natural frequency of the inductive coil F is unaffected by insertion of a resistor in the circuit and a condenser value has to be connected to terminals M and M1 in order to complete the tuned circuit, then the resistance connected in parallel with condenser being measured has little or no effect upon the measurement. The reason is that when resistance is connected to terminals M and MI the resulting impedance is very low, but when a condenser is also connected in parallel with the resistor, it forms a by-pass across the resistor resulting in a high impedance circuit, allowing the total capacity reactance of condensers C8 and the condenser being measured, in series, plus the inductive reactance of coil F, to form a variable tuned circuit which can be varied to the resonance frequency of an oscillator signal by varying the capacity of condenser C8.

As before stated, due to the use of D. C. blocking condensers C4, C6 and C11 at high potential ends of secondary coil E and coil F, respectively, and to the fact that the low potential ends of these same coils are not connected to ground potential, there is no effective circuit for D. C. voltage from test terminals M and MI to any portion of the tester circuit. A condenser connected to test terminals M and MI may thus be measured for quantity and quality while such condenser is connected to a D. C. voltage supply source.

The foregoing is true regardless of whether a known or unknown capacity condenser is measured in either range position P or P1. The art of changing the reactance of tuned circuit at low potentials is exactly the same in either instance, and the basic circuit is the same.

From the foregoing description, taken in connection with the drawing, the construction and mode of use of my improved measuring device will be readily understood and its advantages in enabling the capacity of a condenser in a radio circuit to be determined, without disconnecting the condenser from the circuit, will be appreciated by radio repairmen and others, since it enables the effective capacity of a condenser in service to be accurately determined without liability of injuring the condenser or any other parts in the circuit. The fact that the invention also provides a measuring device which will allow the capacity of a condenser connected in parallel with a low ohm resistance or in a low or high resistance circuit, or to a source of D. C. voltage supply, to be determined with accuracy, also makes the device of great value for the use of repairmen and others in making such testing operations.

While the structural organization disclosed is preferred, it will, of course, be understood that changes in the form, arrangement and construction of parts, and constants of parts used may be made within the scope of the appended claims, without departing from the spirit or sacrificing any of the advantages of the invention.

What I claim is:

1. In an apparatus for measuring the capacity of a condenser connected in a radio circuit, a pair of test terminals adapted to be connected with the ends of the condenser to be tested, an oscillating signal generating circuit, means for adjusting said circuit to operate at a fixed frequency or at varying frequencies within a predetermined frequency range, a tuned resonance circuit including a tuning coil and a variable condenser for tuning the coil into resonance with the signal generated by the signal circuit when oscillating at a frequency determined by the capacity of the condenser under test, means for coordinately adjusting the resonance circuit when the oscillation circuit is adjusted to adapt it to respond to any of the generated frequencies, and means for indicating the resonant frequency of the resonance circuit.

2. In an apparatus for measuring the capacity of a condenser connected in a radio circuit, a pair of test terminals adapted to be connected with the ends of the condenser to be tested, an oscillating signal generating circuit, a resonance circuit coupled to the signal generating circuit, means for normally tuning said resonance circuit within a prescribed tuning range, and controlling means for controlling the signal generating circuit to adapt it to operate at varying frequencies or at a fixed frequency and for controlling the resonance circuit to coordinately vary the tuning range of its tuning means from its normally prescribed tuning range, said controlling means being reversible to control such actions of the circuits, said circuits being normally incomplete for coaction and including connections with the terminals for rendering the circuits complete for coaction upon the connection of the ends of the condenser to be tested with the terminals, and means for indicating the resonant frequency of the resonance circuit.

3. In an apparatus for measuring the capacity of a condenser connected in a radio circuit, a pair of test terminals adapted to be connected with the ends of the condenser to be tested, an oscillating signal generating circuit including an inductance having primary and secondary coils and associated reactances, a resonance circuit coupled to the signal generating circuit and including a tuning coil, a pair of fixed reactances, a variable tuning reactance and means for connecting either of said fixed reactances in circuit with the coil, said circuits being normally incomplete for coaction and including connections with the terminals for rendering the circuits complete for coaction upon the connection of the ends of the condenser to be tested with the terminals, and connections between the circuits including switching means for varying the potentials of the coils and inductance-reactance ratios of the circuits to adjust the oscillating circuit to operate at a fixed frequency or at varying frequencies within a predetermined frequency range and to coordinately adjust the resonance circuit for cooperation therewith.

4. In an apparatus for measuring the capacity of a condenser connected in a radio circuit, a pair of test terminals adapted to be connected with the ends of the condenser to be tested, an oscillating signal generating circuit including an inductance having primary and secondary coils and reactances, a tuned resonance circuit coupled to the signal generating circuit and including a tuning coil, reactances and a variable condenser for tuning the coil, means for varying the potentials of the coils and normal effective inductance-reactance ratios in the respective circuits to adjust the oscillation circuit to operate at a fixed frequency or at varying frequencies within a predetermined frequency range and simultaneously adjusting the resonance circuit for cooperation therewith, and means for indicating the resonant frequency of the resonance circuit.

5. In an apparatus for measuring the capacity of a condenser connected in a radio circuit, a pair of test terminals adapted to be connected to the ends of the condenser to be tested, one of said terminals being normally at ground potential, an oscillating signal generating circuit including an inductance having primary and secondary coils and reactances associated therewith, a resonance circuit coupled to the signal generating circuit and including an inductance coil and a variable tuning condenser and reactances associated therewith, said circuits being normally incomplete and adapted to be completed by the connection of the condenser to be tested with the test terminals, means for placing one end of the inductance coil in either circuit in connection with the test terminal which is normally at ground potential and placing one end of the inductance coil in the other circuit in connection with the other test terminal or vice versa and regulating the inductance-reactance ratios in the circuits to adjust the oscillation circuit to operate at a fixed frequency or at varying frequencies within a predetermined frequency range and simultaneously adjusting the resonance circuit for cooperation therewith, and means for indicating the resonance frequency of the resonance circuit.

6. In an apparatus for measuring the capacity of a condenser connected in a radio circuit, a pair of test terminals adapted to be connected with the ends of the condenser to be tested, an oscillating signal generating circuit including an inductance and a reactance, a resonance circuit coupled to the signal generating circuit and including a tuning coil and a condenser for tuning said coil within a prescribed tuning range, switching means for simultaneously varying the effective inductance-capacity ratios in the circuits to adjust the generating circuit to operate at a fixed frequency or at varying frequencies within a predetermined frequency range and to coordinately vary the tuning range of the resonance circuit, and means for indicating the resonant frequency of the resonance circuit.

7. In an apparatus for measuring the capacity of a condenser connected in a radio circuit, a pair of test terminals adapted to be connected with the ends of the condenser to be tested, an oscillating signal generating circuit including an inductance coil and reactance means, a resonance circuit coupled to the signal generating circuit and including a tuning coil, controlling reactances and a variable condenser for tuning said coil within a prescribed tuning range, switching means for simultaneously varying the potentials of the coils and effective inductance-capacity ratios in the circuits to adjust the generating circuit to operate at a fixed frequency or at varying frequencies within a predetermined frequency range and to coordinately vary the tuning range of the resonance circuit, said circuits being normally incomplete and including connections with the terminals for rendering the circuits complete upon the connection of the ends of the condenser to be tested with the terminals, and means for indicating the resonant frequency of the resonance circuit.

8. In an apparatus for measuring the capacity of a condenser connected in an electrical circuit, a pair of test terminals adapted to be connected with the terminals of the condenser to be tested, an oscillating signal generating circuit including an inductance coil and cooperating reactances and connections for varying the potential of the coil and the inductance-reactance ratios of the circuit to adjust the circuit to oscillate at varying frequencies within a predetermined frequency range or at a fixed frequency, a resonance circuit responsive to the generated signal and including a tuning coil and cooperating reactances and connections for varying the potential of the coil and inductance-reactance ratio of said circuit to adjust it for cooperation with and adapt it to be tuned into resonance with the oscillating circuit at its working frequency ranges, said circuits being normally inactive and adapted to be operatively connected and rendered active for operation when the condenser to be tested is connected with the test terminals, switching means for cooperation with the connections to so vary the actions of the circuits, a condenser for tuning said tuning coil into resonance with the signal generated by the signal circuit when said circuits are coupled by the condenser under test, and means for indicating the resonant frequency of the resonance circuit.

9. In an apparatus for measuring the capacity of a condenser connected in an electrical circuit, a pair of test terminals adapted to be connected with the terminals of the condenser to be tested, an oscillation signal generating circuit, a resonance circuit responsive to the generated signal and adapted to be tuned to a frequency determined by the condenser under test, said circuits being normally inactive and adapted to be operatively connected and rendered active for operation when the condenser to be tested is connected with the test terminals, controlling means in said circuits and cooperative switching means for shifting the same into and out of action and varying the actions of the circuits so as to adjust the oscillation circuit to operate at a fixed frequency or at varying frequencies within a predetermined frequency range and to coordinately adjust the resonance circuit to adapt it to be tuned into resonance with any of the generated frequencies, means for tuning the resonance circuit, and means for indicating the resonant frequency of the resonance circuit.

10. In an apparatus for measuring the capacity of a condenser connected in a radio circuit, a pair of test terminals adapted to be connected to the ends of the condenser to be tested, an oscillating signal generating circuit, means for adjusting said last named circuit to operate at a fixed frequency or at varying frequencies within a predetermined frequency range, a resonance circuit having tuning means therein adapting it to be tuned into resonance with the signal generated by the signal circuit at a frequency determined by the capacity of the condenser under test, means for coordinately adjusting the resonance circuit when the signal generating circuit is adjusted to adapt it to respond to any of the generated frequencies, said circuits being normally incomplete for coaction and adapted to be completed for coaction by the connection of the condenser to be tested with the test terminals, and means for indicating the resonant frequency of the resonance circuit.

ROBY J. CLAY.